United States Patent [19]
van Belle

[11] Patent Number: 4,902,222
[45] Date of Patent: Feb. 20, 1990

[54] GAS BURNER

[75] Inventor: Arie van Belle, Am Gouda, Netherlands

[73] Assignee: Flameco-Eclipse B.V., Gouda, Netherlands

[21] Appl. No.: 243,899

[22] Filed: Sep. 13, 1988

[30] Foreign Application Priority Data

Sep. 15, 1987 [NL] Netherlands ............... 8702191

[51] Int. Cl.⁴ ................................................ F23C 5/06
[52] U.S. Cl. ...................................... 431/186; 431/187; 431/353
[58] Field of Search ............... 431/353, 187, 186, 62, 431/90; 126/110 C, 110 R; 432/222, 159; 239/407, 414, 417.3

[56] References Cited

U.S. PATENT DOCUMENTS

| | | | |
|---|---|---|---|
| 1,943,750 | 1/1934 | Tryon | 431/186 X |
| 2,385,153 | 9/1945 | Morton | 431/186 |
| 4,125,360 | 11/1978 | Culbertson | 431/187 |
| 4,334,854 | 6/1982 | Graat et al. | 431/186 X |

Primary Examiner—Randall L. Green
Attorney, Agent, or Firm—Head & Johnson

[57] ABSTRACT

Described is a gas burner, that works with an excess of combustion air.

According to the invention the gas burner is provided with a by-pass conduit for a portion of the combustion air and with a built-in gas control valve and a built-in air control valve, which valves are coupled to be moveable in synchronism, and the air control valve is provided with means for adjustably dividing the combustion air.

6 Claims, 3 Drawing Sheets

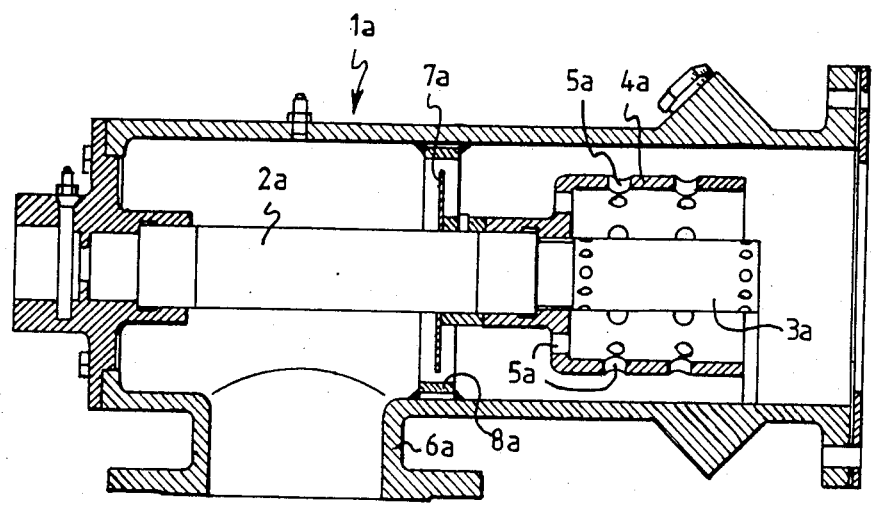
FIG. 1 (PRIOR ART)
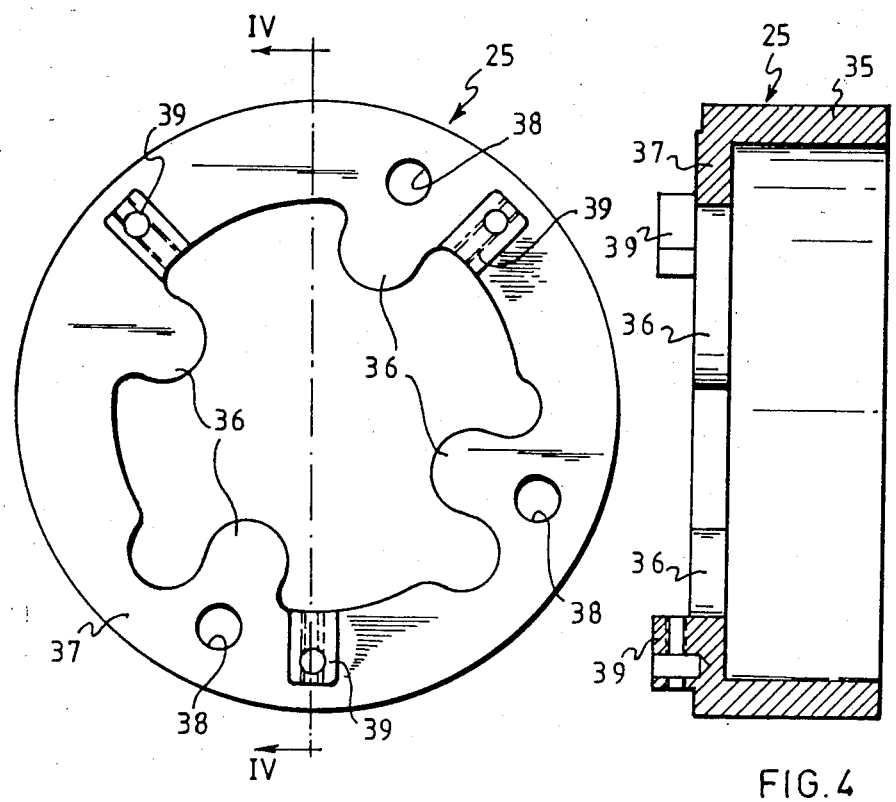
FIG. 3
FIG. 4

GAS BURNER

The present invention relates to a gas burner, provided with means for adjustably supplying a combustible gas and an excess of combustion air.

Such a gas burner is known from applicants' own practice and is drawn in FIG. 1. Said gas burner is used for heating air. The flue gases coming from the burner come into a so-called distributing flue conduit, which distributes the flue gases in the process air stream to be heated. The application field is substantially drying cupboards in printing machines, carpet machines, stone drying plants and similar applications where hot air is required for drying products. Said known burner has a housing $1a$ with a coaxially fixed gas supply pipe $2a$, which debouches into a gas nozzle $3a$, which is surrounded by a mixing cup $4a$ with air inlet passages $5a$. The housing $1a$ is provided with a radial connecting piece $6a$ for the combustion air and coaxially in the housing an air distributing plate $7a$ is mounted on the gas tube $2a$, which cooperates with a ring $8a$ in the housing and provides for a distribution of the combustion air all around. A gas supply line with an adjusting valve (not drawn) is connected to the gas supply pipe $2a$ and an air supply line with an adjusting valve (not drawn) is connected to the connecting piece $6a$. With this known burner, which is operated with an amount of combustion air, which is about 200% of the stoichiometric amount required, the total amount of combustion air, fed to the burner and mixed with the gas, should be adjusted down, simultaneously with the amount of gas, so that under-cooling of the flame is prevented and no carbon monoxide is formed, while the combustion air is injected also with a lower pressure from the injection nozzles of the distributor pipe into the process air stream, so that it cannot be properly mixed therewith.

The aim of the invention is to remove this objection of the known burner.

For this purpose the gas burner according to the invention is characterized in that the gas burner is provided with a by-pass conduit for a portion of the combustion air, which is not used for the formation of the combustible gas/air/mixture, said by-pass conduit being connected to the flue conduit in a point spaced from the burner, in that the gas burner is provided with a built-in gas control valve and with a built-in air control valve, which are coupled so as to be moveable in synchronism, and in that the air control valve is provided with means for adjustably dividing the combustion air into the amount used for the formation of the gas/air/mixture, and the amount respectively, flowing through the by-pass conduit, in such a way that when the first amount increases, the second amount decreases accordingly and vice versa.

By applying said measures it is reached, that in spite of the excess of combustion air, which normally would undercool temperature of the flame, still such a flame temperature of the burner is reached, that the formed flue gases meet severe environmental requirements. At the same time, because of the excess of air, the temperature of the flue gases decreases, so that it is mixed better with the process air stream, and the temperatures are closer together. This applies to a low load as well as to a high load of the gas burner. With a low load the same amount of combustion air flows through the gas burner as with a high load, so that the spraying pressure at the nozzles in the distributing pipe consequently remains the same.

With a preferred embodiment of the gas burner, which is provided with a housing, a gas nozzle, a supply line provided with an adjusting valve and connected with the gas nozzle, an air supply line provided with an adjusting valve and connected to the gas nozzle, a mixing cup positioned around the gas nozzle and having passages and a combustion chamber connected to the mixing cup, which gas burner is connected with a flue conduit, according to the invention the by-pass conduit is formed between the inner wall of the flue conduit and the outer wall of a part of the housing and is connected to the air supply by means of one or more passages, the air control valve consists of a slide valve, provided with valve means cooperating with said passages and with valve means co-operating with the passages in the mixing cup, the gas control valve is provided with a valve rod with a valve body which cooperates with an annular seating in the gas nozzle, on the valve rod a carrier is secured, which is connected by one or more rods to the slide valve and the valve rod can be driven by a servomotor.

Because of this construction, a very broad control range is possible, the ratio between the maximum load and the minimum load being 30:1, dependent on the type of gas used.

With a particularly effective embodiment of the gas burner according to the invention, the slide valve has an annular body with an L-shaped cross-section, which is co-axially displacable in said housing, the long leg of the L cooperating with passages in the housing part and the short leg of the L being provided with radial lips for the passages in the mixing cup, the gas control valve is mounted centrally and axially movable in the burner housing and is provided with a conical valve body, the diameter of which becomes smaller in the direction of the gas flow and in the valve body a bore is provided, which on the one side is connected with the gas supply line and on the other side debouches into the gas nozzle.

By applying said measures a constructively compact and yet rugged gas burner is obtained, which can be manufactured comparatively cheap and moreover needs no or little maintenance.

The invention will be further elucidated with an example with the aid of the drawings.

FIG. 1 is a longitudinal cross-section view of a prior art gas burner.

FIG. 3 is a front view of the air control valve of the gas burner according to FIG. 2.

FIG. 4 is a cross-section according to line IV-IV in FIG. 3 and

Figure 2:
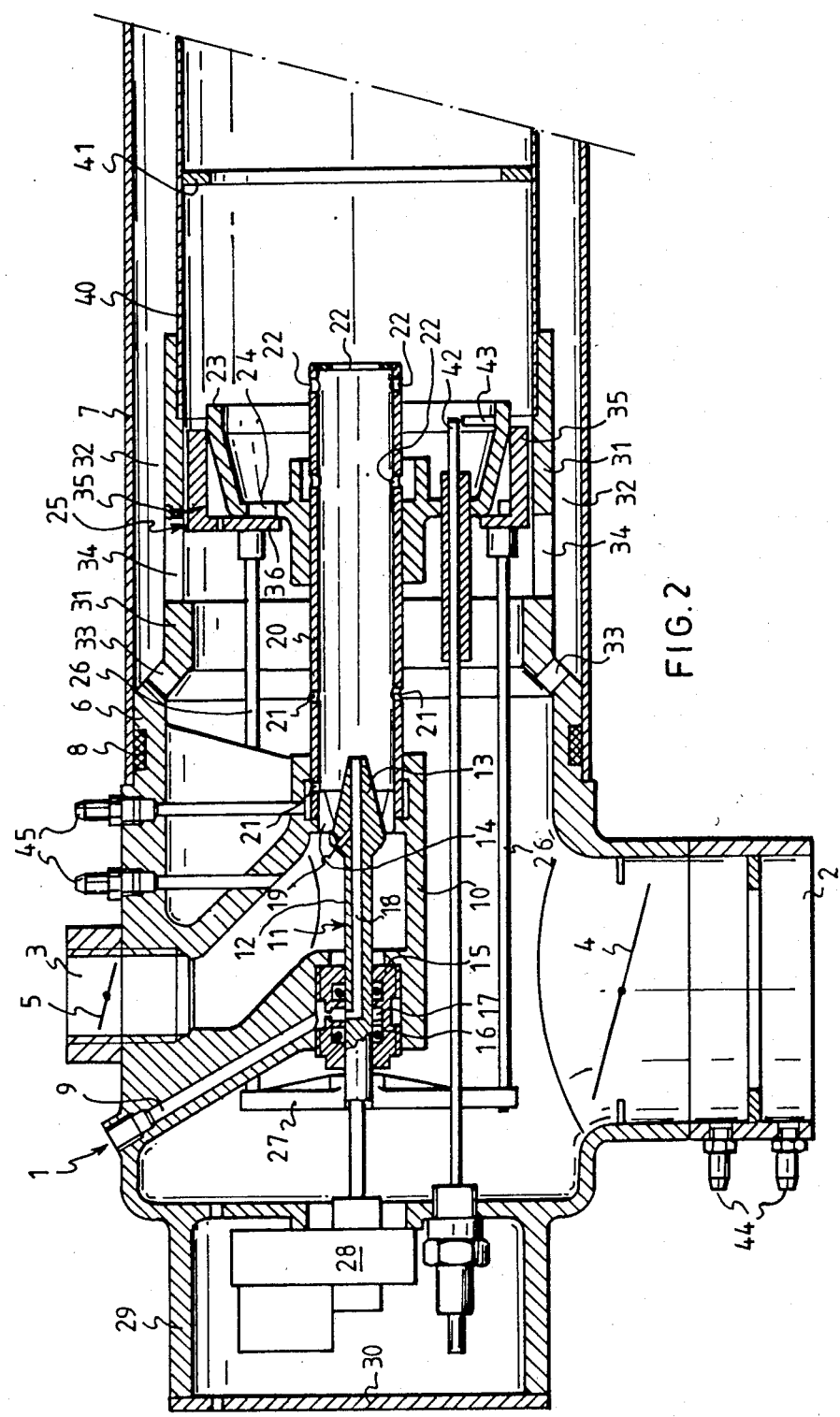
FIG. 2 is a longitudinal cross-section of the gas burner according to the invention.

The gas burner according to FIG. 2 is provided with a housing having an air supply conduit 2 with a connection for an air line (not drawn) and a gas supply conduit 3 with a connection for a gas line (not drawn).

In the air conduit 2 and the gas conduit 3 an adjusting valve 4 and 5 respectively are mounted. The adjusting valves 4 and 5 are not used for controlling the burner, but for adjusting once-only the maximum capacity, if more than one burner are connected to one combustion air fan and to one gas group. The housing 1, which preferably has a round cross-section, is provided with a part 6 with a smaller diameter, which is mounted to fit in the end of the distributor pipe and is sealed with a packing 8 to avoid leakage of the flue gases which are under over-pressure. As a result of this, the burner system gets a more simple and compact construction because the conventional connecting flanges of the known burner can be omitted. In the housing 1 further a conduit 9 is formed which is connected with an ignition gas conduit (not drawn).

Centrally in the housing 1 a boss 10 is formed wherein a gas supply—and control valve 11 is mounted, which is provided with a valve rod 12 and with a (truncated) conical valve body 13, which cooperates with an annular valve seating, which is secured in the boss 10. The valve seating preferably has a passage which tapers outwardly in the flow direction of the gas.

The valve rod 12 is axially slideably mounted in a connecting block 15, which is sealed to the valve rod 12 with the aid of O-rings 16 and which is provided with a ring groove 17, which is connected with the conduit 9 for the ignition gas. The ring groove 17 in its turn is connected with a bore 18 in the valve rod 12, which debouches at the top of the valve body 13. Further in the valve body 13 a bore 19 is made which on the one side is connected with the gas conduit 3 and on the other side with the bore 18.

In the right end of the boss 10 illustrated in FIG. 2, a gas nozzle 20 is mounted, which with its left end is mounted around the annular valve seating 14. The gas nozzle 20 is provided with air inlet holes 21 and with mixture exhaust holes. On the gas nozzle 20, e.g. a round tube, a mixing cup 23 is secured, which is used for optimum mixing gas and combustion air. In the mixing cup 23 on the side facing the gas valve a plurality, in the drawn embodiment four, of air passages 24 are made.

Around the mixing cup 23 an air control valve 25 is mounted which is carried out as slide valve, and which has an L-shaped cross-section. The slide 25 is axially movable and is provided with three carrier rods 26, which on the left side of the boss in FIG. 2 are connected with a star-shaped carrier 27, secured on the left end in FIG. 2 of the valve rod 12. The left end of the valve rod 12 is coupled with a servomotor 28, capable of driving a nut (not drawn), screwed on the screw threaded (not drawn) valve rod 12, so that the valve rod 12 and consequently the gas control valve 11 and the air control valve 25 are axially adjustable in synchronism. The servomotor 28 is mounted in a carter 29 formed at the housing 1 and sealable by a cover 30.

A part 31 is connected to the part 6 of the housing 1, the diameter of which is even smaller than that of part 6 and between part 31 and the distributing pipe 7 a by-pass conduit 32 is confined, which is connected with the air supply line 2 by means of passages 33 and 34. The passages 33 and 34 are preferably disposed in the form of a row relatively small openings in circumferential direction.

With the burner in operation the "long leg" (the axial, cylindrical part) 35 of the L-shaped slide 25 cooperates with the passages 34 and the lips 36 on the "short leg" (the radial part) 37 cooperate with the passages 24 in the bottom of the mixing cup 23; vide also FIG. 3 and 4.

The short leg of the slide valve 25 (FIG. 3 and 4) is further provided with three bores 38 for an ignition electrode (described hereinafter) an ionisation pin and a looking glass (not drawn). On the short leg 37 on the outside further bosses 39 are disposed, wherein the carrier rods 26 are secured with bolts.

The gas burner according to the invention is further provided with a combustion chamber 40, which is concentrically secured in the part 31 of the housing 1 and which is provided with one or more mixing rings 41. Also an ignition electrode 42 is disposed in the mixing cup 23, which may form a spark towards an earth plate 43. Finally in the housing 1 and in the air conduit measuring nipples 44 and 45 respectively are mounted, by which the amounts of gas and air respectively can be determined at the places in question.

Figure 5:
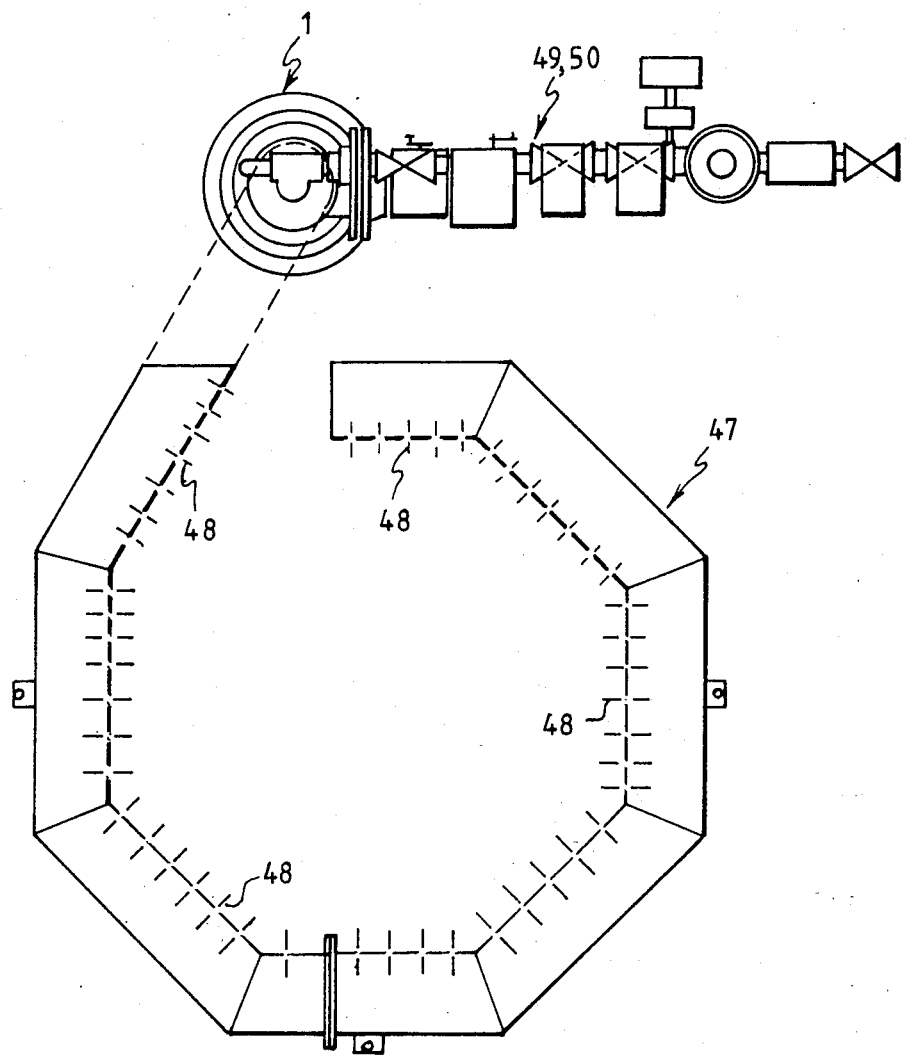
FIG. 5 is a side view of a heating system for process air, wherein the gas burner according to the invention may be applied.

In FIG. 5 an air heating system 46 is drawn, which is provided with a gas burner according to the invention. The system 46 is provided with a distributing pipe 47, which is carried out substantially in the form of an octagon and which is mounted in a process air line (not drawn) in which the air must be heated. The process air flows perpendicularly on the plane of the drawing and the combustion gases of the burner 1 from nozzles 48 on the inside of the pipe 47 flow perpendicularly into the stream of process air, so as to cause proper mixing with the process air. The system is also provided with a measuring and control apparatus 49, 50.

The operation of the gas burner according to the invention is as follows:

The burner is ignited by supplying combustion air to the burner through the air conduit 2 and by supplying ignition gas through conduit 9. The air control valve 25 should be in the drawn minimum position and the combustion air flows through the passages 33 and 34 into the by-pass conduit 32 between the part 31 of the housing and the air distributing pipe at the outside past the mixing cup 23 and the combustion chamber 40 into the distributing pipe. Only a small portion of combustion air leaks between the air control slide 25 and the passages 24 sealed by the lips 36 into the mixing cup 23 and into the combustion chamber 40. Further combustion air flows through the air premixing holes 21 into the gas nozzle 20.

The ignition gas in the conduit 9 flows through the ring groove 17 and the bore 18 into the gas control valve further into the gas nozzle 20 and the mixture formed therein flows through the openings 22 into the mixing cup 23 and into the combustion chamber 40 and is further mixed there with combustion air. The gas control valve 11 should be in closed position. If upon starting the gas control valve 11 is not in the right position, then the bore 18 is not in alignment with the ring groove 17, and then no gas flows into the gass nozzle 20 and no flame is formed, and the start is interrupted by the flame rod assembly. If the gas control valve is in the right closed position, the ignition gas arrives in the gas nozzle 20. In the gas nozzle the gas is admixed with the air, flowing through the air premixing holes 21. The thus formed gas/air/mixture flows out of the openings 22 of the gas nozzle 20 and is ignited by the ignition electrode 42, which forms a spark towards the earth plate 43, both electrodes being mounted in the mixing cup 23.

If a flame is formed, then the non-drawn flame rod assembly detects the presence of a flame. The control is then released and main gas is supplied through the gas conduit. The gas control valve 11 however is still closed and only a minimum amount of gas can flow through bore 19, bore 18 and gas nozzle 20 via the opening 22 into the mixing cup 23 and the combustion chamber 40.

The supply of the ignition gas through conduit 9 is now closed and the burner is now in operation in the minimum position. If more heat is required the servomotor receives the order to move the gas control valve 21 in FIG. 2 to the left, so that the valves 13 and 14 are opened. As a result of this more gas flows into the gas nozzle 20. By moving the valve rod 12 to the left, the air control slide 25 is also moved to the left by means of the carrier 27 and the carrier rods 26, so that the passages 34 become smaller and consequently less air flows through the by-pass conduit 32, while simultaneously the lips 36 open the passages 24 in the mixing cup 23 and more air can flow into the mixing cup 23 and the combustion chamber 24, while also more combustion air can flow between the air control slide 25 and the mixing cup 23 into the combustion chamber 40, since because of the tapered form of the circumferential wall of the mixing cup 23, the ring gap between the cylindrical part 35 of the air control slide 25 and the outer wall of the mixing cup 23 becomes greater when the air control slide 28 is moved to the left. In this way the burner is provided not only with more gas but also with more combustion air. By gradually closing the passages 34 less air flows at the outside around the real burner and more air passes through the burner. Adjusting towards the minumum position of the burner of course takes place in reversed order.

The adjusting valves 3 and 4 for gas and air respectively are not used for controlling the burner, but for once-only adjusting the maximum capacity, if more than one burner are connected to one combustion air fan and to one gas group.

The present invention relates to a burner for heating air. The flue gases coming from the burner flow into a so-called flue conduit, which distributes said flue gases into the process air stream to be heated. By adapting the flue gas distributing conduit to the situation, it is possible to reach a proper temperature distribution in the air stream to be heated. The field of application is substantially drying cupboards in printing machines, carpet machines, stone drying plants and similar applications, where hot air is required for drying products.

For the supply of the required combustion air the burner should be connected to a combustion air fan. It is possible, that more than one burner are provided with air by one fan.

The combustion air to be supplied in the maximum position is required only half for the combustion, so that consequently an excess of air of 100% is used. The other half does not take part in the combustion, but takes care that the temperature in the distributing pipe does not rise too much. When controlling the burner back to the position with minimum load, the full amount of combustion air necessary for the maximum load keeps on flowing though the burner. Normally this would result in a too strong cooling of the flame, but by a number of extra provisions, which are elucidated above, one takes care that the excess of air passes around the flame. Consequently always the same amount of air flows into the distributing pipe, only the temperature at which said air comes as flue gas out of the distributing holes varies, dependent on the load of the burner, from about 100° to 1000° C.

Since in the distributing pipe an overpressure of about 10 mbar prevails, the hot flue gases are blown strenuously into the process air stream to be heated. This is the case with full load and with minimum load, so that the flue gases are properly mixed with the process air with all loads.

The surplus of combustion air which prevents that the distributing pipe becomes too hot, also keeps the flame temperature relatively low, so that the formation of the noxious nitrogen oxide is considerably decreased, while still a good combustion with little carbon monoxide and unburnt gas can be obtained.

I claim:

1. A gas burner with a flue conduit provided with means for adjustably supplying a combustible gas, and an excess of combustion air comprising a by-pass conduit for a portion of the combustion air which is not used for the formation of a combustible gas/air/mixture, which by-pass conduit is connected with the flue conduit at a point spaced from the burner, the gas burner being further provided with a built-in gas control valve and with a built-in air control valve, which are coupled so as to be moveable in synchronism, the air control vale provided with means for adjustably dividing the combustion air into a first amount, which is used for formation of the gas/air/mixture, and a second amount for flow through the by-pass conduit, such that when the first amount increases the second amount decreases accordingly and vice versa.

2. A gas burner comprising a housing, a gas nozzle, a gas supply pipe provided with an adjusting valve and connected with the gas nozzle, an air supply pipe provided with an adjusting valve and connected with the gas nozzle, a mixing cup positioned around the gas nozzle and having passages, as well as a combustion chamber connected to the mixing cup, said gas burner being connected to a flue conduit, a by-pass conduit formed between the inner wall of the flue conduit and the outer wall of a part of the housing, said by-pass conduit connected by one or more passages with the air supply pipe, the air control valve being comprised of a slide valve provided with valve means cooperating with said passages and a valve means cooperating with the passages in the mixing cup, the gas control valve being provided with a valve rod and a valve body cooperating with an annular seat in the gas nozzle, a carrier secured on the valve rod which is connected with the slide valve by one or more rods and a servomotor means to drive the valve rod.

3. A gas burner according to claim 2 wherein the slide valve has an annular body with an L-shaped cross-section, which is coaxially displaceable in the said housing, the horizontal leg of the L cooperating with the passages by-pass the conduit and the vertical leg of the L cooperating with the passages in the mixing cup, the gas control valve being mounted centrally and axially movable in the burner housing and being provided with a conical valve body, the diameter of which becomes smaller in the flow direction of the gas, the valve body having a bore which communicates the gas from the supply pipe into the nozzle.

4. A gas burner according to claim 3, wherein in the burner housing an ignition gas conduit is mounted, which in one position of the gas control valve is in communication with a bore in the valve body, debouching into the gas nozzle.

5. A gas burner according to claim 2, 3, or 4, wherein the burner housing is coaxially mounted in the flue conduit.

6. A gas burner according to claim 5, wherein the combustion chamber is coaxially connected to the concentric housing part and the combustion chamber is provided with one or more mixing rings mounted therein.

* * * * *